US012700410B2

(12) United States Patent
Rallabhandi

(10) Patent No.: US 12,700,410 B2
(45) Date of Patent: Aug. 4, 2026

(54) METHOD AND SYSTEM FOR AUTOMATICALLY VISUALIZING A TRANSCRIPT

(71) Applicant: JPMorgan Chase Bank, N.A., New York, NY (US)

(72) Inventor: Anusha Rallabhandi, Hyderabad (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 167 days.

(21) Appl. No.: 18/538,325

(22) Filed: Dec. 13, 2023

(65) Prior Publication Data

US 2024/0203418 A1     Jun. 20, 2024

(30) Foreign Application Priority Data

Dec. 20, 2022    (IN) .............................. 202211073895

(51) Int. Cl.
G06F 16/00 (2019.01)
G10L 15/26 (2006.01)
(52) U.S. Cl.
CPC ..................................... G10L 15/26 (2013.01)
(58) Field of Classification Search
CPC ...................................................... G10L 15/26
See application file for complete search history.

(56) References Cited

U.S. PATENT DOCUMENTS

| | | | | | |
|---|---|---|---|---|---|
| 10,339,681 | B2 * | 7/2019 | Moore | .................. | G06T 11/206 |
| 11,315,569 | B1 * | 4/2022 | Talieh | ................. | H04L 12/1831 |

| | | | | | |
|---|---|---|---|---|---|
| 2006/0161890 | A1 * | 7/2006 | Green | ........................ | G06F 8/74 |
| | | | | | 717/114 |
| 2006/0161901 | A1 * | 7/2006 | Srinivasamurthy | .... | G06Q 10/06 |
| | | | | | 717/132 |
| 2007/0129942 | A1 * | 6/2007 | Ban | ........................ | G06F 40/169 |
| | | | | | 704/235 |
| 2007/0169053 | A1 * | 7/2007 | Kodosky | ................... | G06F 8/34 |
| | | | | | 717/136 |
| 2007/0239445 | A1 * | 10/2007 | Kobal | ..................... | G10L 15/22 |
| | | | | | 704/E15.04 |

(Continued)

OTHER PUBLICATIONS

Yang, A et al. Zero-Shot Video Question Answering via Frozen Bidirectional Language Models. NeurIPS 2022. [online], [retrieved Jul. 28, 2025]. Retrieved from the Internet <URL:https://arxiv.org/abs/2206.08155> (Year: 2022).*

(Continued)

*Primary Examiner* — Syed H Hasan
(74) *Attorney, Agent, or Firm* — GREENBLUM & BERNSTEIN, P.L.C.

(57) ABSTRACT

A method and a system for automatically visualizing a transcript are disclosed. The method is implemented by at least one processor. The method includes receiving a voice input from at least one entity. Further, the method includes recognizing speech from the voice input using a speech recognition technique. Further, the method includes processing the recognized speech using at least one signal processing technique to enhance the speech, where the speech is processed to remove an unwanted noise. Further, the method includes converting the processed speech into a transcript using a speech transcription technique. Thereafter, the method includes automatically visualizing the transcript into a design diagram.

16 Claims, 4 Drawing Sheets

(56) References Cited

U.S. PATENT DOCUMENTS

| | | | | |
|---|---|---|---|---|
| 2008/0255847 | A1* | 10/2008 | Moriwaki | G10L 21/06 704/270.1 |
| 2009/0080641 | A1* | 3/2009 | Fitzgerald | H04M 3/493 379/265.11 |
| 2012/0226500 | A1* | 9/2012 | Balasubramanian | G10L 13/033 704/260 |
| 2015/0381817 | A1* | 12/2015 | Zhao | H04L 65/4038 379/202.01 |
| 2017/0160889 | A1* | 6/2017 | Bogusky | G06F 3/0482 |
| 2019/0392616 | A1* | 12/2019 | Lu | G06T 11/26 |
| 2019/0392837 | A1* | 12/2019 | Jung | G10L 15/22 |
| 2021/0151058 | A1* | 5/2021 | Cheung | H04R 1/406 |
| 2022/0141047 | A1* | 5/2022 | Adlersberg | H04L 12/1831 709/204 |
| 2023/0023037 | A1* | 1/2023 | Aseniero | G06F 3/167 |
| 2023/0214194 | A1* | 7/2023 | Arai | G06F 8/34 717/109 |
| 2023/0238002 | A1* | 7/2023 | Hirano | G10L 17/02 704/232 |
| 2023/0267922 | A1* | 8/2023 | Siohan | G10L 15/1815 704/205 |
| 2023/0343002 | A1* | 10/2023 | Zhang | G06T 11/203 |
| 2024/0127818 | A1* | 4/2024 | Attwater | G10L 15/26 |
| 2024/0347039 | A1* | 10/2024 | Ijima | G10L 13/08 |
| 2024/0395155 | A1* | 11/2024 | Scholz | G09B 5/02 |

OTHER PUBLICATIONS

Chen, Y et al., UNITER: UNiversal Image-TExt Representation Learning. ECCV 2020 [online][retrieved Jan. 8, 2026]. Retrieved from the Internet <URL: https://arxiv.org/abs/1909.11740> <DOI: https://doi.org/10.48550/arXiv.1909.11740> (Year: 2020).*

* cited by examiner

P67900

METHOD AND SYSTEM FOR AUTOMATICALLY VISUALIZING A TRANSCRIPT

CROSS-REFERENCE TO RELATED APPLICATIONS

This application claims priority benefit from Indian Application No. 202211073895, filed on Dec. 20, 2022 in the Indian Patent Office, which is hereby incorporated by reference in its entirety.

FIELD OF THE DISCLOSURE

This technology generally relates to methods and systems for automatically visualizing transcripts and more particularly to methods and systems for automatically converting speech into a transcript and then converting the transcript into design diagrams using various natural language processing based models and techniques.

BACKGROUND INFORMATION

The following description of the related art is intended to provide background information pertaining to the field of the disclosure. This section may include certain aspects of the art that may be related to various features of the present disclosure. However, it should be appreciated that this section is used only to enhance the understanding of the reader with respect to the present disclosure, and not as admissions of the prior art.

It is known that during the development of any project, a lot of decisions are made, and a lot of deviations occur due to the involvement of various entities at different stages of the project. Due to this, a communication gap is created between the presenter/project head and the team members, which affects the efficiency and output of the project. The design diagrams that are created manually by the team members initially and the diagrams finalized after various discussions at the end of the projects may vary due to various iterations in the projects. For instance, working on transforming the project's requirements into a design for implementation until the day the application goes to production, a lot of decisions are made, and a lot of deviations from the original design are made that come across with the design in hand. Thus, most of the time, the final version of the diagram often gets changed from the design diagrams that are developed initially by team members resulting in a loss of the information associated with the project. Additionally, it also creates a problem for the members joining the project at a later stage to guess and identify the reasons associated with multiple changes that occurred at the interim stage of the project.

Hence, in view of these and other existing limitations, there arises an imperative need to provide an efficient solution to overcome the above-mentioned limitations and to provide a method and system to automatically visualize transcripts using at least one trained model.

SUMMARY

The present disclosure, through one or more of its various aspects, embodiments, and/or specific features or sub-components, provides, inter alia, various systems, servers, devices, methods, media, programs, and platforms for automatically visualizing a transcript.

According to an aspect of the present disclosure, a method for automatically visualizing a transcript is disclosed. The method may include receiving, by at the least one processor, a voice input from at least one entity. Further, the method may include recognizing, by the at least one processor, speech from the voice input using a speech recognition technique. Further, the method may include processing, by the at least one processor, the recognized speech using at least one signal processing technique to enhance the speech, wherein the speech is processed to remove an unwanted noise. Further, the method may include converting, by the at least one processor, the processed speech into a transcript using a speech transcription technique. Thereafter, the method may include automatically visualizing, by the at least one processor, the transcript into a design diagram.

In accordance with an exemplary embodiment, the speech recognition technique comprises at least one from among an automatic speech recognition technique and a wake word detection technique.

In accordance with an exemplary embodiment, the speech transcription technique comprises at least one from among a natural language understanding technique and a natural language generation technique.

In accordance with an exemplary embodiment, the automatically visualizing the transcript into the design diagram may include the step of encoding, by the at least one processor, the transcript using a frozen language model: and generating, by the at least one processor, the design diagram using a frozen clip model.

In accordance with an exemplary embodiment, the voice input may be received via an audio input device.

In accordance with an exemplary embodiment, the at least one entity is one from among a team member involved in a project, a team lead of the project, a project reviewer, a user to present the project, and a client.

According to another aspect of the present disclosure, a computing device configured to automatically visualizing a transcript is disclosed. The computing device includes a processor: a memory: and a communication interface coupled to each of the processor and the memory. The processor may be configured to receive a voice input from at least one entity. Further, the processor may be configured to recognize speech from the voice input using a speech recognition technique. Further, the processor may be configured to process the recognized speech using at least one signal processing technique to enhance the speech, wherein the speech is processed to remove unwanted noise. Further, the processor may be configured to convert the processed speech into a transcript using a speech transcription technique. Thereafter, the processor may be configured to automatically visualize the transcript into a design diagram.

In accordance with an exemplary embodiment, the speech recognition technique comprises at least one from among an automatic speech recognition technique and a wake word detection technique.

In accordance with an exemplary embodiment, the speech transcription technique comprises at least one from among a natural language understanding technique and a natural language generation technique.

In accordance with an exemplary embodiment, to automatically visualize the transcript into the design diagram, the processor may be configured to encode the transcript using a frozen language model: and generate the design diagram using a frozen clip model.

In accordance with an exemplary embodiment, the voice input is received via an audio input device.

According to yet another aspect of the present disclosure, a non-transitory computer readable storage medium storing instruction for automatically visualizing a transcript is disclosed. The instructions include executable code which, when executed by a processor, may cause the processor to receive a voice input from at least one entity: recognize speech from the voice input using a speech recognition technique: process the recognized speech using at least one signal processing technique to enhance the speech, wherein the speech is processed to remove an unwanted noise: convert the processed speech into a transcript using a speech transcription technique: and automatically visualize the transcript into a design diagram.

In accordance with an exemplary embodiment, the speech recognition technique comprises at least one from among an automatic speech recognition technique and a wake word detection technique.

In accordance with an exemplary embodiment, the speech transcription technique comprises at least one from among a natural language understanding technique and a natural language generation technique.

In accordance with an exemplary embodiment, to automatically visualize the transcript into the design diagram, when executed by the processor, the executable code may further cause the processor to encode the transcript using a frozen language model; and generate the design diagram using a frozen clip model.

In accordance with an exemplary embodiment, the voice input is received via an audio input device.

BRIEF DESCRIPTION OF THE DRAWINGS

The accompanying drawings, which are incorporated herein, and constitute a part of this disclosure, illustrate exemplary embodiments of the disclosed methods and systems in which like reference numerals refer to the same parts throughout the different drawings. Components in the drawings are not necessarily to scale, emphasis instead being placed upon clearly illustrating the principles of the present disclosure. Some drawings may indicate the components using block diagrams and may not represent the internal circuitry of each component. It will be appreciated by those skilled in the art that disclosure of such drawings includes disclosure of electrical components, electronic components or circuitry commonly used to implement such components.

DETAILED DESCRIPTION

Figure 1:
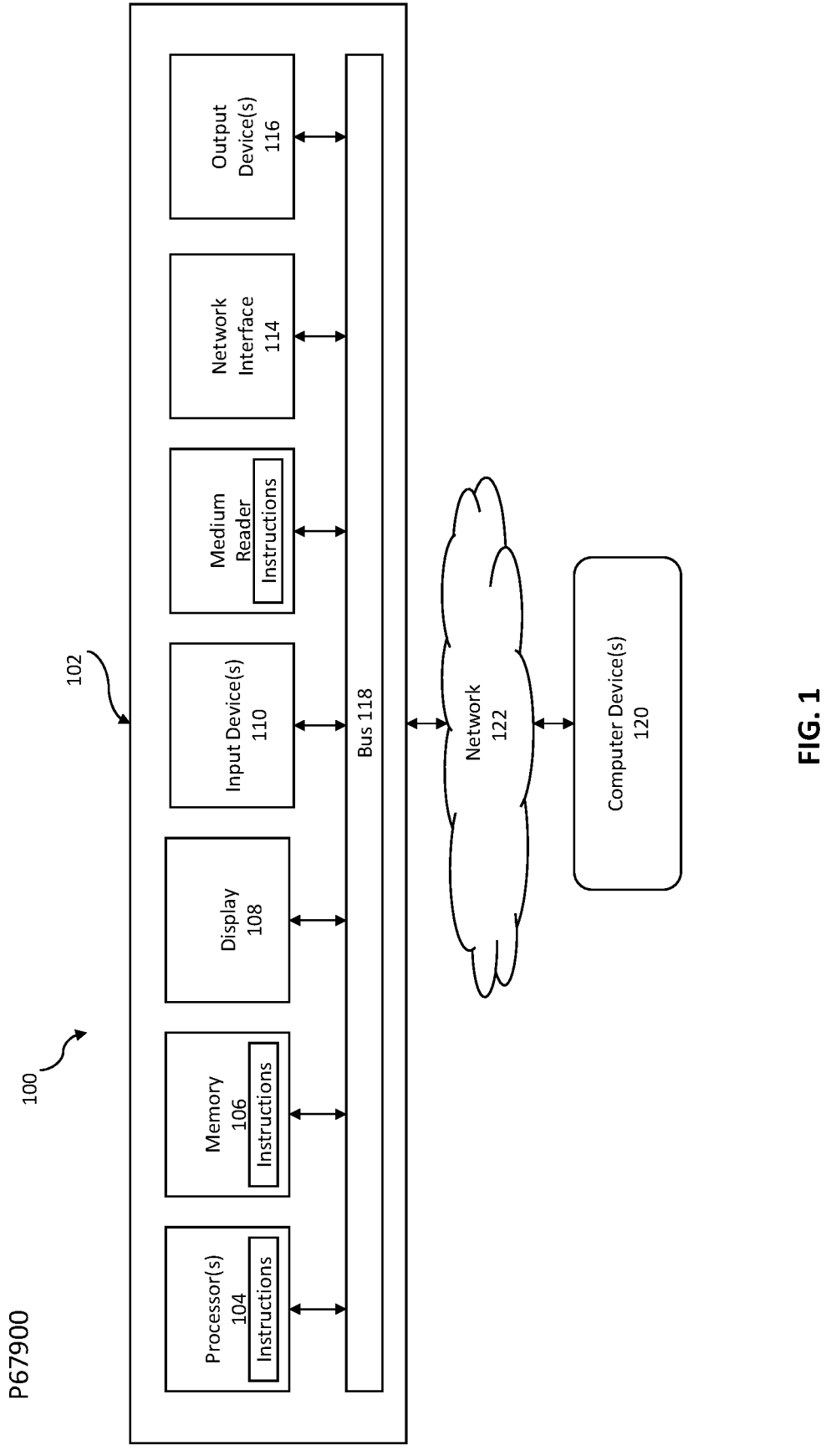
FIG. 1 illustrates an exemplary diagram of a computer system for automatically visualizing a transcript, in accordance with an exemplary embodiment.

Exemplary embodiments now will be described with reference to the accompanying drawings. The disclosure may, however, be embodied in many different forms and should not be construed as limited to the embodiments set forth herein; rather, these embodiments are provided so that this disclosure will be thorough and complete, and will fully convey its scope to those skilled in the art. The terminology used in the detailed description of the exemplary embodiments illustrated in the accompanying drawings is not intended to be limiting. In the drawings, like numbers refer to like elements.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "include", "comprises", "including" and/or "comprising" when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations and arrangements of one or more of the associated listed items. Also, as used herein, the phrase "at least one" means and includes "one or more" and such phrases or terms can be used interchangeably. Furthermore, as used herein, the phrase "set of" means and includes "one or more" and such phrases or terms can be used interchangeably.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The figures depict a simplified structure only showing some elements and functional entities, all being logical units whose implementation may differ from what is shown. The connections shown are logical connections: the actual physical connections may be different.

In addition, all logical units and/or controllers described and depicted in the figures include the software and/or hardware components required for the unit to function. Further, each unit may comprise within itself one or more components, which are implicitly understood. These components may be operatively coupled to each other and be configured to communicate with each other to perform the function of the said unit.

In the following description, for the purposes of explanation, numerous specific details have been set forth in order to provide a description of the disclosure. It will be apparent however, that the disclosure may be practiced without these specific details and features.

Through one or more of its various aspects, embodiments and/or specific features or sub-components of the present disclosure, are intended to bring out one or more of the advantages as specifically described above and noted below.

The examples may also be embodied as one or more non-transitory computer readable storage medium having instructions stored thereon for one or more aspects of the present technology as described and illustrated by way of the examples herein. The instructions in some examples include executable code that, when executed by one or more processors, causes the processors to carry out steps necessary to implement the methods of the examples of this technology that are described and illustrated herein.

To overcome problems associated with the inefficient manual conversion of the transcript into diagrams, the present disclosure provides an efficient solution for automatically visualizing speech into design diagrams using various natural language processing-based models and techniques. In an exemplary scenario, a project manager starts working on a project with a team of at least ten members. During the project discussion, the manager presents various information to the team members related to the project. Also, most of the time, based on the discussion with the team members, a lot of decisions are made to achieve the desired and efficient outcome of the project. Most of the time, the reasons associated with the changes are not tracked due to which new members joining the project at a later stage suffer a lot due to the communication gap. More particularly, the loophole in the existing system is the reason behind the changes goes untracked, making it difficult for new members or team members to understand the strategies taken during the course of the project.

The present disclosure solves the above-mentioned problem and provides a solution of automatically visualizing speech transcripts into design diagrams for ease of understanding and ease of tracking. The present disclosure provides a method and system for automatically visualizing the speech into diagrams. The system first receives a voice input from at least one entity via an audio input device. The at least one entity may include a team member involved in a project, a team lead of the project, a project reviewer, a user to present the project, and/or a client. In an example, the audio input device may be a microphone connected to the system to receive the voice input. The system then recognizes the speech from the voice input using a speech recognition technique, processes the recognized speech, and then converts the speech into a text format or transcript. The speech recognition technique may include an automatic speech recognition technique, a wake word detection technique, or a combination thereof. The wake word detection technique helps the system to activate based on the detection of any word spoken by the at least one entity and start recognizing the words spoken by the at least one entity during the presentation. After recognizing the speech, the system first processes the speech to remove the unwanted noise and then converts the processed speech into a meaningful transcript using trained models such as Natural Language Understanding and Natural Language Generation. In an example, a project manager X using an audio input device says—"We have to finish this project within a month" during the presentation. The statement of the project manager is processed to remove noise from the statement, to recognize that the statement is an active speech or an actual speech, and to convert the speech into a meaningful transcript. In an exemplary implementation, the transcript may be generated in a pdf format or a doc format.

After converting the speech into the meaningful transcript, the system automatically visualizes the transcript into design diagrams using transcription visualization models such as the frozen language model and frozen clip model for the ease of understanding and the ease of tracking.

In continuation of the above example of recognizing and converting the speech into the transcript for the statement "We need to submit this project X within a month", the system visualizes the transcript into a design diagram by tagging a deadline of one month from the date of presentation to the project X. At a later stage, in case the deadline gets extended by one week due to additional features, then the system will depict the same in the updated design diagram so that a member joining the project at a later stage may easily understand the reason of extending the deadline because of the incorporation of the additional features in the project. Thus, the present disclosure provides an efficient solution of automatically visualizing the speech into a transcript and then into design diagrams for ease of understanding and ease of tracking.

As used herein, automatic speech recognition is a machine-learning technique to process user speech into readable text. It allows human beings to use their voices to speak with a computer interface via a microphone or like devices.

As used herein, the term "natural language understanding" refers to a processing technique to understand the unstructured speech text into a structured transcript and to identify the correct order of the text in the transcript. As used herein, the term "natural language generation" refers to a processing technique to convert the structured text into human understandable or meaningful transcript.

As used herein, the frozen language model refers to a pre-trained language model for aligning specific parts of images with the text and enabling various downstream tasks such as visual commonsense reasoning, text-based design retrieval, and text-guided object detection. In an exemplary implementation, the frozen language model may use masked language modeling (MLM), image text matching (ITM), or combinations thereof for the generation of a design diagram from a transcript. The MLM model may require either using a richly annotated dataset with bounding boxes or using an object detection model to generate object region proposals for parts of the input text. The ITM model may be used to predict whether the caption matches the image or not for a given image and caption pair. The objective of MLM and ITM models are often combined during the pre-training of multi-modal models.

As used herein, the frozen clip model is a multi-modal vision and language model used for image-text similarity and zero-shot image classification. In an exemplary implementation, the frozen clip model uses a vision transformer (ViT) to get visual features and a casual language model to get the text features.

FIG. 1 is an exemplary system for use in accordance with the embodiments described herein. The system 100 is generally shown and may include a computer system 102, which is generally indicated. The term "computer system" may also be referred to as "computing device" and such phrases/terms can be used interchangeably in the specifications.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a virtual desktop computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, Blu-ray disk, or any other form of storage medium known in the art. Memories may be volatile or non-volatile, secure and/or encrypted, unsecure and/or unencrypted. As regards the present disclosure, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 104 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof. Additionally, the term "Network interface" may also be referred to as "Communication interface" and such phrases/terms can be used interchangeably in the specification.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect expresses, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultra-band, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for automatically visualizing speech into design diagrams.

Figure 2:
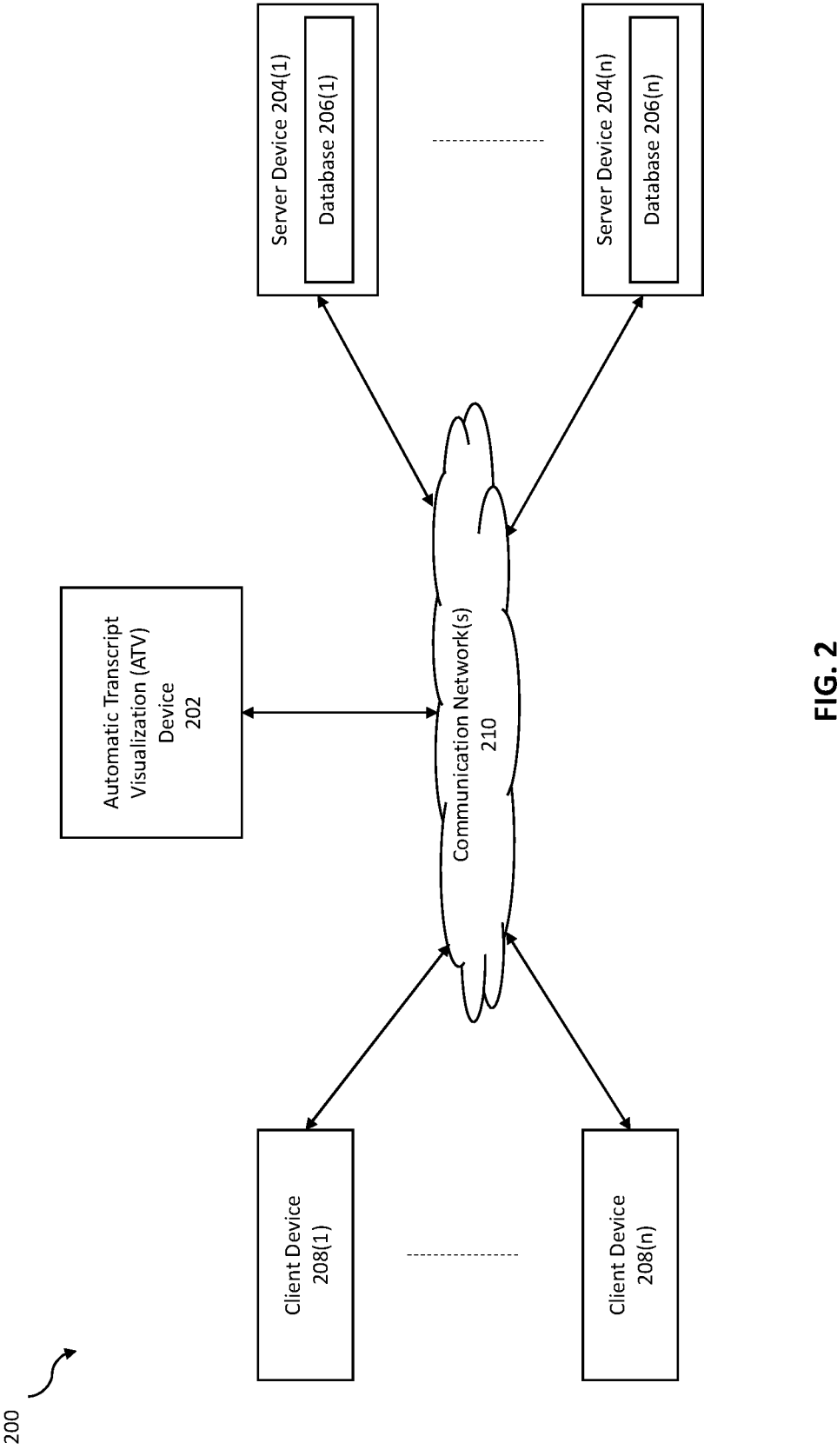
FIG. 2 illustrates an exemplary diagram of a network environment for automatically visualizing a transcript, in accordance with an exemplary embodiment.

Referring to FIG. 2, a schematic of an exemplary network environment 200 for implementing a method for automatically visualizing speech into design diagrams is illustrated. In an exemplary embodiment, the method is executable on any networked computer platform, such as, for example, a personal computer (PC).

The method for automatically visualizing speech into design diagrams is implemented by an Automatic Transcript Visualization (ATV) device 202. The ATV device 202 may be the same or similar to the computer system 102 as described with respect to FIG. 1. The ATV device 202 may store one or more applications that can include executable instructions that, when executed by the ATV device 202, cause the ATV device 202 to perform desired actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

In a non-limiting example, the application(s) may be operative in a cloud-based computing environment. The application(s) may be executed within or as virtual machine(s) or virtual server(s) that may be managed in a cloud-based computing environment. Also, the application(s), and even the ATV device 202 itself, may be located in virtual server(s) running in a cloud-based computing environment rather than being tied to one or more specific physical network computing devices. Also, the application(s) may be running in one or more virtual machines (VMs) executing on the ATV device 202. Additionally, in one or more embodiments of this technology, virtual machine(s) running on the ATV device 202 may be managed or supervised by a hypervisor.

In the network environment 200 of FIG. 2, the ATV device 202 is coupled to a plurality of server devices 204(1)-204(n) that hosts a plurality of databases 206(1)-206(n), and also to a plurality of client devices 208(1)-208(n) via communication network(s) 210. A communication interface of the ATV device 202, such as the network interface 114 of the computer system 102 of FIG. 1, operatively couples and communicates between the ATV device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the ATV device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and ATV devices that efficiently implement a method for automatically visualizing speech into design diagrams.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, tele traffic in any suitable form (e.g., voice, modem, and the like), Public Switched Telephone Network (PSTNs), Ethernet-based Packet Data Networks (PDNs), combinations thereof, and the like.

The ATV device 202 may be a standalone device or integrated with one or more other devices or apparatuses, such as one or more of the server devices 204(1)-204(n), for example. In one particular example, the ATV device 202 may include or be hosted by one of the server devices 204(1)-204(n), and other arrangements are also possible. Moreover, one or more of the devices of the ATV device 202 may be in a same or a different communication network including one or more public, private, or cloud networks, for example.

The plurality of server devices 204(1)-204(*n*) may be the same or similar to the computer system 102 or the computer device 120 as described with respect to FIG. 1, including any features or combination of features described with respect thereto. For example, any of the server devices 204(1)-204 (*n*) may include, among other features, one or more processors, a memory, and a communication interface, which are coupled together by a bus or other communication link, although other numbers and/or types of network devices may be used. In an example, the server devices 204(1)-204 (*n*) may process requests received from the ATV device 202 via the communication network(s) 210 according to the HTTP-based and/or JavaScript Object Notation (JSON) protocol, for example, although other protocols may also be used.

The server devices 204(1)-204(*n*) may be hardware or software or may represent a system with multiple servers in a pool, which may include internal or external networks. The server devices 204(1)-204(*n*) hosts the databases 206(1)-206 (*n*) that are configured to receive raw speech data, process speech data, encode text into image data, convert the image into diagram data, data associated with machine learning models.

Although the server devices 204(1)-204(*n*) are illustrated as single devices, one or more actions of each of the server devices 204(1)-204(*n*) may be distributed across one or more distinct network computing devices that together comprise one or more of the server devices 204(1)-204(*n*). Moreover, the server devices 204(1)-204(*n*) are not limited to a particular configuration. Thus, the server devices 204 (1)-204(*n*) may contain a plurality of network computing devices that operate using a controller/agent approach, whereby one of the network computing devices of the server devices 204(1)-204(*n*) operates to manage and/or otherwise coordinate operations of the other network computing devices.

The server devices 204(1)-204(*n*) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(*n*) may also be the same or similar to the computer system 102 or the computer device 120 as described with respect to FIG. 1, including any features or combination of features described with respect thereto. For example, the client devices 208 (1)-208(*n*) in this example may include any type of computing device that can interact with the ATV device 202 via communication network(s) 210. Accordingly, the client devices 208(1)-208(*n*) may be mobile computing devices, desktop computing devices, laptop computing devices, tablet computing devices, or the like, that host chat, e-mail, or voice-to-text applications, for example. In an exemplary embodiment, at least one client device 208 is a wireless mobile communication device, e.g., a smartphone.

The client devices 208(1)-208(*n*) may run interface applications, such as standard web browsers or standalone client applications, which may provide an interface to communicate with the ATV device 202 via the communication network(s) 210 in order to communicate user requests and information. The client devices 208(1)-208(*n*) may further include, among other features, a display device, such as a display screen or touchscreen, and/or an input device, such as a keyboard, for example.

Although the exemplary network environment 200 with the ATV device 202, the server devices 204(1)-204(*n*), the client devices 208(1)-208(*n*), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the ATV device 202, the server devices 204(1)-204(*n*), or the client devices 208(1)-208(*n*), for example, may be configured to operate as virtual instances on the same physical machine. In other words, one or more of the ATV device 202, the server devices 204(1)-204(*n*), or the client devices 208(1)-208(*n*) may operate on the same physical device rather than as separate devices communicating through communication network(s) 210. Additionally, there may be more or fewer ATV devices 202, server devices 204(1)-204(*n*), or client devices 208(1)-208 (*n*) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only tele traffic in any suitable form (e.g., voice and modem), wireless traffic networks, cellular traffic networks, Packet Data Networks (PDNs), the Internet, intranets, and combinations thereof.

Figure 3:
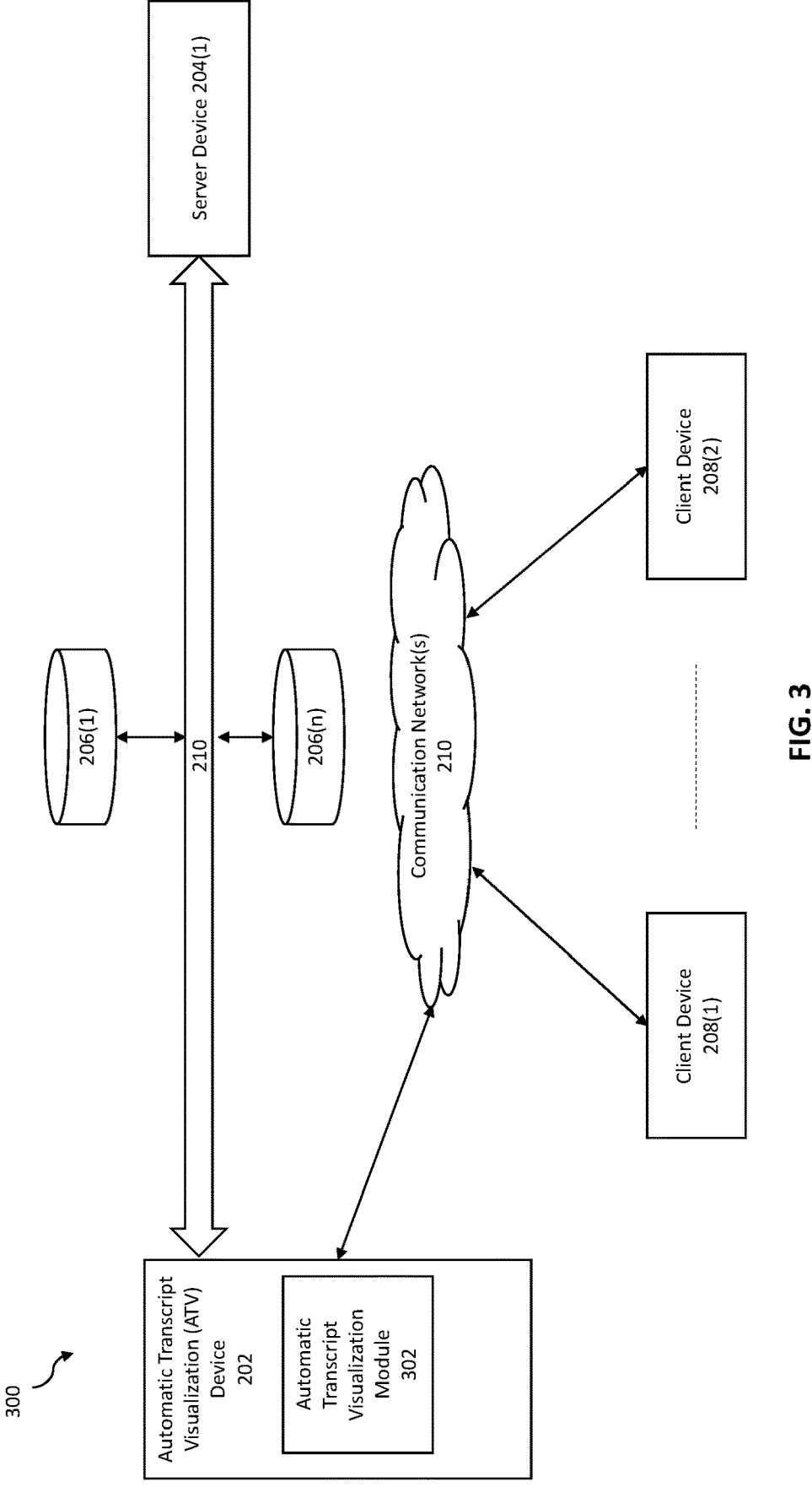
FIG. 3 illustrates an exemplary diagram of a system for implementing a method for automatically visualizing a transcript, in accordance with exemplary embodiment.

FIG. 3 illustrates an exemplary system 300 for implementing a method for automatically visualizing speech into design diagrams using natural language processing based models, in accordance with an exemplary embodiment. As illustrated in FIG. 3, according to exemplary embodiments, the system 300 may comprise an ATV device 202 including an ATV module 302 that may be connected to a server device 204(1) and one or more repository 206(1) . . . 206(*n*) via a communication network 210, but the disclosure is not limited thereto.

The ATV device 202 is described and shown in FIG. 3 as including an Automatic Transcript Visualization module 302, although it may include other rules, policies, modules, databases, or applications, for example. As will be described below, the Automatic Transcript Visualization module 302 is configured to implement a method for automatically visualizing speech into design diagrams.

An exemplary process for implementing a mechanism for automatically visualizing speech into design diagrams by utilizing the network environment of FIG. 2 is shown as being executed in FIG. 3. Specifically, a first client device 208(1) and a second client device 208(2) are illustrated as being in communication with ATV device 202. In this regard, the first client device 208(1) and the second client device 208(2) may be "clients" of the ATV device 202 and are described herein as such. Nevertheless, it is to be known and understood that the first client device 208(1) and/or the second client device 208(2) need not necessarily be "clients" of the ATV device 202, or any entity described in association therewith herein. Any additional or alternative relationship may exist between either or both of the first client device 208(1) and the second client device 208(2) and the ATV device 202, or no relationship may exist.

Further, ATV device 202 is illustrated as being able to access the one or more repositories 206(1) . . . 206(n). The Automatic Transcript Visualization Module 302 may be configured to access these repositories/databases for implementing a method for providing automatic visualization of processed speech into design diagrams using trained model techniques.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the ATV device 202 via broadband or cellular communication. Of course, these embodiments are merely exemplary and are not limiting or exhaustive.

Figure 4:
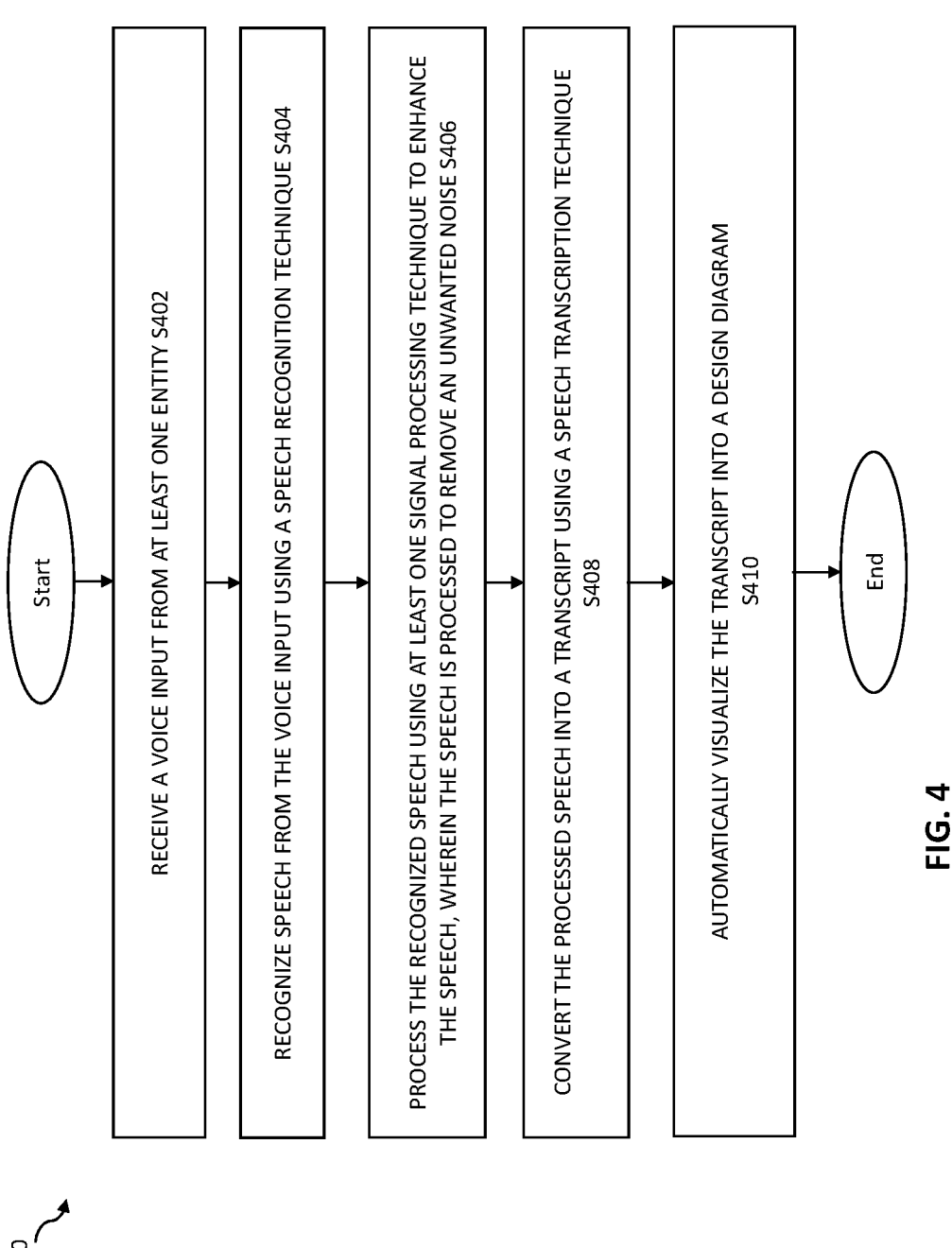
FIG. 4 illustrates an exemplary method flow diagram for automatically visualizing a transcript, in accordance with an exemplary embodiment.

Referring to FIG. 4 an exemplary method flow diagram depicting a method 400 for automatically visualizing speech into design diagrams, in accordance with an exemplary embodiment, is shown.

In the method 400 of FIG. 4, at step S402, the method includes receiving, by at least one processor 104, a voice input from at least one entity. In an exemplary implementation, the voice input may be received via an audio input device such as a microphone connected with the system. Further, the voice input may include active speech or inactive speech. As used herein, the at least one entity may include one from among a team member involved in a project, a team lead of the project, a project reviewer, a user to present the project, a client, and/or a combination thereof.

In an exemplary implementation, the at least one entity may be a project manager who gives a presentation on any project X to the team members with all the relevant information related to the project X. The at least one entity may give the presentation either online or offline depending upon the availability of members, location of the members and the like.

At step S404, the method comprises recognizing, by the at least one processor 104, speech from the voice input using a speech recognition technique. The speech may be recognized as an active speech or actual speech after removing unwanted noise from the voice input. The speech recognition technique may include at least one from among an automatic speech recognition technique and a wake word detection technique. The automatic speech recognition technique is a machine learning-based technique that allows human beings to use their voice to speak with a computer interface via an audio input device such as a microphone. The speech recognition technique breaks the speech down into bits (0, 1) and then converts it into a digital format for further analysis such as conversion of speech into text.

As used herein, the wake word detection technique refers to a processing technique to detect (spot) keywords and phrases in audio streams and conversations. The wake word technique is mainly used for voice activation during any active conversation or discussion. Further, the wake word technique is required for the device to understand that someone has started speaking about the project. In an exemplary implementation, user Y starts the presentation with "Good morning", the phrase "Good morning" may act as wake-up words for the device to understand that the presentation has been started by user Y.

At step S406, the method includes processing, by the at least one processor 104, the recognized speech using at least one signal processing technique to enhance the speech. The speech is processed to remove an unwanted noise such as fan sound, sound pertaining to internal discussion, or the sound with a value less than a pre-defined threshold value. Further, the speech of user is enhanced by removing the unwanted noise and cleaning the input signals for better output results. In an exemplary implementation, when user X says "Hello everyone" to their team members, the sound of traffic near the office, the low-frequency sound of the fan, the sound of the construction works going around, the low sound discussion between different members and the like are removed to enhance the quality of speech signal. The signal processing technique may involve the use of a bandpass filter, low-pass filter, loudness control, acoustic echo cancellation, and the like for enhancing the quality of the speech signals and for better understanding of the voice signals.

At step S408, the method includes converting, by the at least one processor 104, the processed speech into a transcript using a speech transcription technique. The speech transcription technique comprises at least one from among a natural language understanding technique and a natural language generation technique. The natural language understanding technique is used to correctly understand the speech of user while the natural language generation technique is used to generate a meaningful transcript out of the raw text.

Further, the natural language generation technique converts a raw transcript into a processed transcript which mimics a human's conversations with its real intent. In an example, user X says, "Connect A, B", then there are various possibilities that user X is trying to say either to Connect A from B or to Connect B from A or to mutually connect A and B. The natural language understanding and natural language generation techniques will identify the correct command in the order based on the context and will convert the raw transcript into a meaningful representation. These techniques using the past data or trained data identify the actual intention of user X without losing the information and the intention behind the speech.

At step S410, the method comprises automatically visualizing, by the at least one processor 104, the transcript into the design diagram. The technique of visualization is to comprehend vast amounts of raw data in a representable form such as diagrams, or flow charts. The visual design diagram helps to understand the transcript more efficiently and to measure its impact on the projects or applications not limited thereto. The design diagram further communicates the insight visually to internal and external team members as well.

To visualize the transcript in the design diagram, the method includes the step of encoding, by the at least one processor 104, the transcript using a frozen language model. In an exemplary implementation, the transcript is first converted into a tokenized text based on text processing. Further, the tokenized text is passed to the frozen language model to convert the text of the transcript into a sequence of embeddings to capture the meaning and context of the text. In an exemplary implementation, the frozen language model may represent a pre-trained language model like Bidirectional Encoder Representations from Transformers (BERT). Next, the frozen language model may output to an embedding layer, where tokens are mapped to vector representations. Next, the embedding layer may output to the hidden layer(s), which may represent the neural network layers responsible for processing and transforming the embeddings through various transformer layers or other architectures and finally send a corresponding output to the output layer. The output layer may generate the final outputs, which may include text predictions, scores, and embeddings. Finally, the model produces an "Output" that is often used for various natural language processing tasks such as sentiment analysis, and language understanding tasks to encode the transcript.

Next, the method includes the step of generating, by the at least one processor 104, the design diagram using a frozen clip model. The frozen clip model is used to create images or design that matches the provided textual descriptions of the transcript. In an exemplary implementation, the frozen clip model is used for embedding the text and to determine a relationship between the text and corresponding images. For example, when the tokenized text "location Z" is passed to the frozen clip model, it will understand that these words likely describe an image of location Z.

Next, the frozen clip model may output text and image embeddings. The text embeddings may represent the output of the frozen clip model for text, and image embeddings may represent a comparison of text with images in an embedding space. Further, text embedding may refer to the conversion of words or phrases into a set of numbers to represent the meaning of the text, while image embedding may refer to the conversion of an image into a corresponding set of numbers to represent the visual content of the image. Next, the output of the text embedding and image embedding is compared to determine the degree or closeness of the relationship between the text and the corresponding image. Thereafter, an output is generated based on the comparison of the text and image embedding. The output may be the result, such as retrieval results, or recommendations, such as text-to-design retrieval. In an example, when a user says, "Use Approach A for Project Y and Approach B for Project Z", then the transcript will be encoded by sequences of embedding, such as displaying two flow or design diagrams for two statements. In a non-limiting embodiment, the frozen clip model technique is used to generate a design diagram from the encoded transcript. Further, it synthesizes a plurality of embedding into the meaningful design diagram. Thus, the present disclosure provides a method and system for automatically visualizing the transcript into the design diagram using the frozen clip model and frozen language model.

Accordingly, with the technology of the present disclosure, an optimized process for automatically visualizing a transcript is disclosed. As is evident from the above disclosure, the present solution provides a significant technical advancement over the existing solutions by automatically visualizing speech into transcripts and design diagrams. Further, automatic visualization of the speech into the design diagrams prevents loss of information at any stage of the project.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed;

rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

According to yet another aspect of the present disclosure, a non-transitory computer readable storage medium storing instruction for automatically visualizing a transcript, is disclosed. The instructions include executable code which, when executed by a processor, may cause the processor to receive a voice input from at least one entity: recognize speech from the voice input using a speech recognition technique: process the recognized speech using at least one signal processing technique to enhance the speech, wherein the speech is processed to remove an unwanted noise: convert the processed speech into a transcript using a speech transcription technique: and automatically visualize the transcript into a design diagram.

In accordance with an exemplary embodiment, the speech recognition technique comprises at least one from among an automatic speech recognition technique and a wake word detection technique.

In accordance with an exemplary embodiment, the speech transcription technique comprises at least one from among a natural language understanding technique and a natural language generation technique.

In accordance with an exemplary embodiment, to automatically visualize the transcript into the design diagram, when executed by the processor, the executable code may further cause the processor to encode the transcript using a frozen language model: and generate the design diagram using a frozen clip model.

In accordance with an exemplary embodiment, the voice input is received via an audio input device.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents and shall not be restricted or limited by the foregoing detailed description.

What is claimed is:

1. A method for automatically visualizing a transcript, the method comprising:

receiving, by at least one processor, a voice input from at least one entity;

recognizing, by the at least one processor, speech from the voice input in response to detecting a predetermined keyword or phrase in the voice input, the predetermined keyword or phrase representing a wake word for which transcription of the voice input shall commence;

removing, by the at least one processor, unwanted noise from the recognized speech using at least one signal processing technique to enhance the speech, wherein the speech is processed to remove an unwanted noise, wherein the at least one signal processing technique includes a bandpass filter, a low-pass filter, loudness control, and/or acoustic echo cancellation;

converting, by the at least one processor, the enhanced speech into a transcript using a speech transcription technique; and automatically visualizing, by the at least one processor, the transcript into a design diagram, comprising:

training a language model for aligning specific parts of images with text to create a frozen language model;

converting the transcript into tokenized text;

passing the tokenized text into a frozen language model to convert the tokenized text into a sequence of embeddings that captures meaning and context of the tokenized text;

mapping, by an embedding layer, the tokenized text to vector representations;

processing, by one or more hidden layers, the vector representations using a transformer architecture or other neural network architecture to generate transformed representations; and generating, by an output layer from the transformed representations, an output including text predictions, scores, and/or embeddings.

2. The method of claim 1, wherein the design diagram is a flowchart.

3. The method as claimed in claim 1, wherein the speech transcription technique comprises at least one from among a natural language understanding technique and a natural language generation technique.

4. The method as claimed in claim 1, wherein the automatically visualizing the transcript into the design diagram comprises:

generating, by the at least one processor, the design diagram using a frozen clip model.

5. The method as claimed in claim 1, wherein the voice input is received via an audio input device.

6. The method as claimed in claim 1, wherein the at least one entity is one from among a team member involved in a project, a team lead of the project, a project reviewer, a user to present the project, and a client.

7. A computing device for automatically visualizing a transcript, the computing device comprising:

a processor;

a memory; and a communication interface coupled to each of the processor and the memory, wherein the processor is configured to:

receive a voice input from at least one entity;

recognize speech from the voice input in response to detecting a predetermined keyword or phrase in the voice input, the predetermined keyword or phrase representing a wake word for which transcription of the voice input shall commence;

remove unwanted noise from the recognized speech using at least one signal processing technique to enhance the speech, wherein the speech is processed to remove an unwanted noise, wherein the at least one signal processing technique includes a bandpass filter, a low-pass filter, loudness control, and/or acoustic echo cancellation;

convert the enhanced speech into a transcript using a speech transcription technique; and automatically visualize the transcript into a design diagram, comprising:

train a language model for aligning specific parts of images with text to create a frozen language model;

convert the transcript into tokenized text;

pass the tokenized text into a frozen language model to convert the tokenized text into a sequence of embeddings that captures meaning and context of the tokenized text;

map, by an embedding layer, the tokenized text to vector representations;

process, by one or more hidden layers, the vector representations using a transformer architecture or other neural network architecture to generate transformed representations; and generate, by an output layer from the transformed representations, an output including text predictions, scores, and/or embeddings.

8. The computing device of claim 7, wherein the design diagram is a flowchart.

9. The computing device as claimed in claim 7, wherein the speech transcription technique comprises at least one from among a natural language understanding technique and a natural language generation technique.

10. The computing device as claimed in claim 7, wherein to automatically visualize the transcript into the design diagram, the processor is further configured to:

generate the design diagram using a frozen clip model.

11. The computing device as claimed in claim 7, wherein the voice input is received via an audio input device.

12. A non-transitory computer readable storage medium storing instructions for automatically visualizing a transcript, the storage medium comprising executable code which, when executed by a processor, causes the processor to perform operations comprising:

receive a voice input from at least one entity;

recognize speech from the voice input in response to detecting a predetermined keyword or phrase in the voice input, the predetermined keyword or phrase representing a wake word for which transcription of the voice input shall commence;

remove unwanted noise from the recognized speech using at least one signal processing technique to enhance the speech, wherein the speech is processed to remove an unwanted noise, wherein the at least one signal processing technique includes a bandpass filter, a low-pass filter, loudness control, and/or acoustic echo cancellation;

convert the enhanced speech into a transcript using a speech transcription technique; and automatically visualize the transcript into a design diagram, comprising:

train a language model for aligning specific parts of images with text to create a frozen language model;

convert the transcript into tokenized text;

pass the tokenized text into frozen language model to convert the tokenized text into a sequence of embeddings that captures meaning and context of the tokenized text;

map, by an embedding layer, the tokenized text to vector representations;

process, by one or more hidden layers, the vector representations using a transformer architecture or other neural network architecture to generate transformed representations; and generate, by an output layer from the transformed representations, an output including text predictions, scores, and/or embeddings.

13. The storage medium of claim 12, wherein the design diagram is a flowchart.

14. The storage medium as claimed in claim 12, wherein the speech transcription technique comprises at least one from among a natural language understanding technique and a natural language generation technique.

15. The storage medium as claimed in claim 12, wherein to automatically visualize the transcript into the design diagram, when executed by the processor, the executable code further causes the processor to:

generate the design diagram using a frozen clip model.

16. The storage medium as claimed in claim 12, wherein the voice input is received via an audio input device.

\* \* \* \* \*